UNITED STATES PATENT OFFICE.

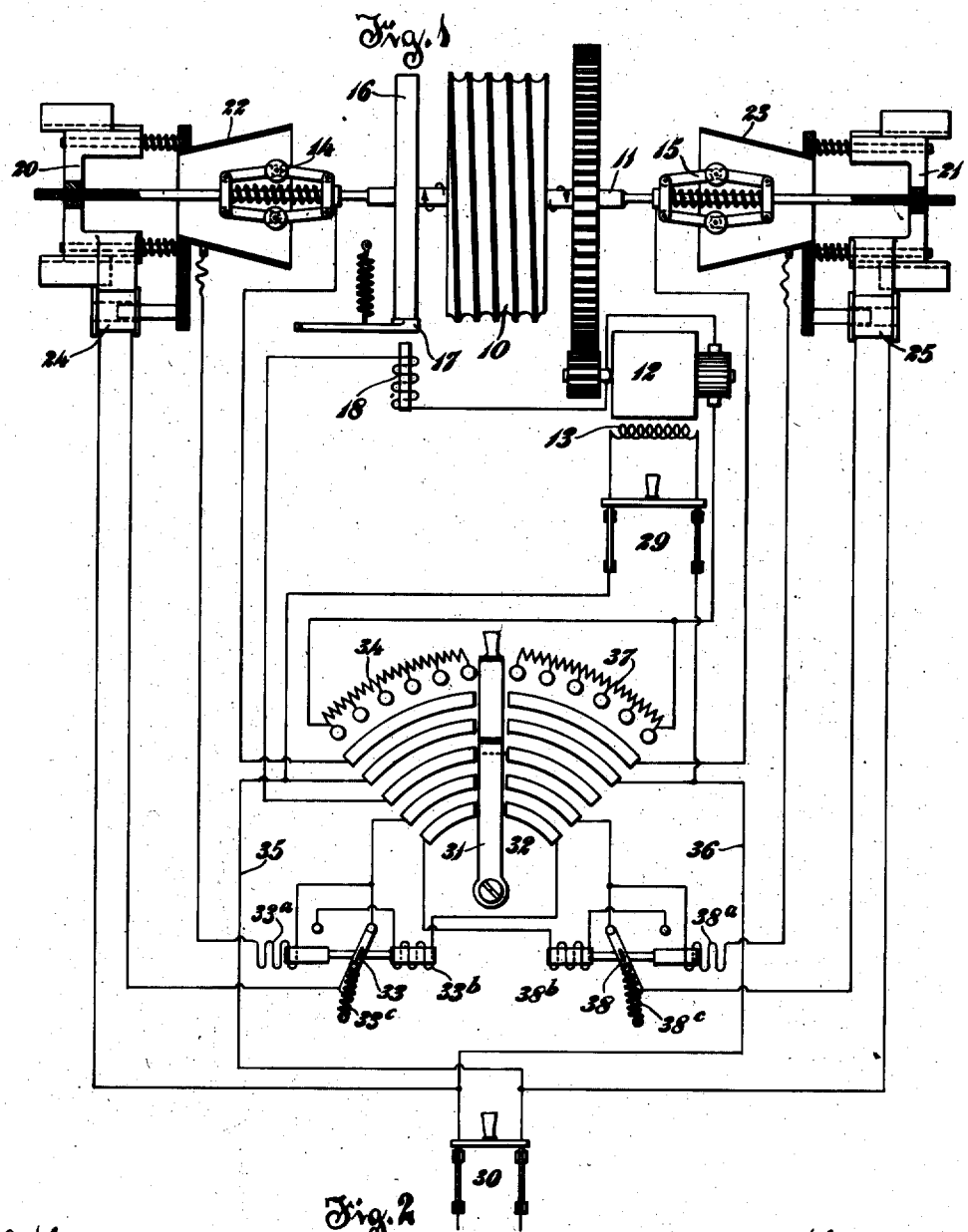

ALBERT G. WESSLING, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

CONTROLLING APPARATUS.

No. 903,348.  Specification of Letters Patent.  Patented Nov. 10, 1908.

Application filed December 9, 1907. Serial No. 405,767.

*To all whom it may concern:*

Be it known that I, ALBERT G. WESSLING, citizen of the United States, residing at Norwood, in the county of Hamilton and State of Ohio, have invented certain new and useful Improvements in Controlling Apparatus, of which the following is a full, clear, and exact specification.

My invention relates to automatic stopping devices for power-driven machinery.

In operating many kinds of power-driven machinery, it is necessary for the sake of safety that some means be provided for interrupting the supply of power when or before the limit of movement is reached. A number of such schemes have been devised. So far as I am aware, however, they all have one common objection. On account of the momentum of the moving parts the driven mechanism does not stop immediately upon interrupting the supply of power, but continues a short distance farther. The amount of such movement after the cessation of the supply of power depends upon the speed with which the parts were moving and upon the load which the driven mechanism places upon the source of power. It is believed that none of the devices heretofore constructed for automatically interrupting the supply of power as the driven mechanism approaches its limit of movement have taken into account the possible differences in speed and in load, and so all of them have generally either stopped the mechanism sooner than was necessary or have allowed it to overrun the desired stopping point.

It is the main object of my present invention to provide means whereby an automatic stopping device interrupts the supply of power to power-driven mechanism at such a time that the final stopping of the mechanism takes place at the desired point regardless of its previous speed or the load which it has put upon the source of power. With this object in view, I have provided means whereby the supply of power to power-driven mechanism is interrupted when such mechanism in its approach toward a limit of its movement has reached a point the distance of which from such limit is a function of either the speed or the load or both the speed and load of the driven mechanism.

Considered somewhat more specifically my invention provides in connection with driven mechanism, such as an elevator, a hoist, or the like, and an electric motor for driving it, means whereby the supply of current to the motor is shut off when the driven mechanism is approaching a limit of its movement and is at such distance therefrom that by the momentum of the moving parts the driven mechanism will be carried just to the predetermined limit of movement, whatever the speed and the load of such mechanism.

The various novel features of my invention will be apparent from the description and drawings and will be particularly pointed out in the claims.

Figure 1 shows somewhat diagrammatically a hoisting apparatus driven by an electric motor and provided with one form of my improved automatic stopping device; and Fig. 2 shows a modification of the device responsive to speed and load for controlling the point at which the supply of current to the motor is interrupted.

A winding drum 10 mounted on a shaft 11 in Fig. 1 represents any form of power-driven mechanism, being here shown as a winding drum because my invention is perhaps especially applicable to hoisting machinery of various sorts. The shaft 11 and the parts carried thereby are driven by the electric motor 12, here shown as having a shunt field winding 13, though obviously other forms of field windings may be used if desired. Shaft 11 carries two sets of fly balls 14 and 15 and a brake disk 16, the brake 17 which coöperates with the latter being normally spring-pressed into engagement with it but arranged to be disengaged by the electromagnet 18 in the armature circuit of the motor 12. The ends of the shaft 11 are threaded and engage with nuts in slides 20 and 21, which thus move longitudinally of the shaft as the shaft is rotated. The slides 20 and 21 carry hollow members 22 and 23 respectively, the inner surfaces of which are tapered. These tapered surfaces may be conical, paraboloidal, or any other shape which is found best in each particular case, being here shown as conical for the sake of simplicity. These internally tapered members 22 and 23 are spring-pressed away from the slides 20 and 21, but are drawn toward such slides by magnets 24 and 25 respectively. These magnets are respectively in the armature circuit of the motor and thus controlled by the load on the motor when the fly balls and tapered members with which they are respectively associated are approaching each other. As the shaft 11 rotates in one direction the fly balls 14 and tapered member 22 approach each other, and when it is rotated in the other direction the fly balls 15 and tapered member 23 approach each other, the approaching parts engaging in either case at a time determined by the distention of the fly balls and the strength of current in the magnet 24 or 25.

The main switch 30 and field switch 29 being closed, the motor 12 can be started to drive the shaft in either direction by moving the arm 31 of the controller 32 to either side of its middle or off position. Assume that the arm 31 is moved to the left. As soon as the arm engages the various contact segments of the left hand side of the controller 32, the circuit of the motor armature 12 is completed from the left hand side of the switch 30, through the magnet 24, double-throw solenoid switch 33 in its inner position, the lower part of the arm 31, magnet 18, armature 12, such part of the resistance 34 as is to the left of the arm 31, the upper part of the arm 31, and conductor 35 to the right hand side of the switch 30.

The brake 17 is lifted by the magnet 18, and the motor will start and continue to drive the shaft 11 and the winding drum 10 at a speed determined by the position of the arm 31 and in the direction of the arrow at the left of said drum as long as the arm 31 is in engagement with any of the buttons of the resistance 34, unless the drum approaches a limit of its movement. In such case the tapered member 22 will engage with the fly balls 14 at a point determined by the speed of the shaft 11 and the strength of the armature current in the magnet 24. The greater the speed of the shaft 11 the sooner the engagement between the member 22 and the fly balls 14, while the heavier the load on the motor 12 the later such engagement will be. Upon such engagement the circuit of solenoid 33ᵃ is closed, and such solenoid attracts its core to move the switch 33 into its outer position, thus breaking the circuit including the motor armature, the magnet 18, and the magnet 24, and also that of the opening magnet 33ᵃ. The motor armature circuit being broken, the driving power for the shaft 11 is cut off, while the deënergization of the magnet 18 allows the brake 17 to be applied to the brake disk 16 to increase the rate of decrease in the speed of the shaft 11. The shape of the internal surfaces of the member 22 and the strength of the spring of the fly balls 14 are so calculated that they will engage to break the armature circuit of the motor 12 whenever the speed of and load on the motor 12 are such that by breaking such circuit at that point the drum 10 will be brought to rest when it has just reached its limit of travel. As shown, the field circuit of the motor is only broken when the switch 29 is opened.

The motor 12, having been thus stopped, can not be started again by any movement of the arm 31 to the left of its middle position, for the circuit of the closing coil 33ᵇ of the switch 33 can only be completed when the arm 31 is moved to the right. When the arm 31 is so moved, the armature circuit of the motor is completed in the opposite direction from the left hand side of switch 30, through the conductor 36, the upper part of the arm 31, such part of the resistance 37 as is to the right of the arm 31, armature 12, brake magnet 18, the lower part of the arm 31, double throw solenoid switch 38 in its inner position, and magnet 25 to the right hand side of the switch 30. As the motor 12 starts up to drive the shaft 11 in the direction of the arrow at the right of the drum 10, brake 17 being lifted by the magnet 18, the switch 33 is thrown into its inner position, breaking the circuit of its closing coil 33ᵇ in its movement.

As long as the arm 31 is to the right of its middle position the motor 12 will continue to operate to drive the drum 10 at a speed determined by the position of such arm, unless the drum reaches a point the distance of which from its limit of movement is such that with the power shut off at that time the momentum of the parts will carry the drum 10 to its limit of movement. This distance, as in the previous case, is a direct function of the speed of the shaft 11 and the corresponding distention of the fly balls 15, and an inverse function of the load on the motor 12 as measured by the current in the magnet 25. When such point is reached the internally tapered member 23 engages the fly balls 15 to complete the circuit of the solenoid 38ᵃ to move the switch 38 to its outer position, thus interrupting the circuit including the armature 12, magnet 18, and magnet 25, and also that of the opening solenoid 38ᵃ. As before, this interrupts the supply of power to the winding drum 10 and allows the brake 17 to be set, bringing the drum 10 to a stop at the proper point. The motor can not now be started by any movement of arm 31 to the right of its middle position, the circuit of closing solenoid 38ᵇ of the double-throw switch 38 being completed only when the arm 31 is moved to the left. Upon such closure of the switch 38 into its inner position the closing solenoid 38ᵇ is deënergized. As long as the drum 10 does not approach either limit of its movement the solenoids 33ᵃ and 38ᵃ are inactive, and the controller 32 controls the direction and the speed of the armature 12 in the usual manner.

The switches 33 and 38 are provided with springs 33ᵉ and 38ᵉ respectively, which hold such switches in either extreme position in which they may be placed. It is impossible to complete the circuits of any of the actuating solenoids of these switches unless such switches are in positions from which they may be moved by such solenoids.

With the arrangement shown in Fig. 1, the magnets 24 and 25 merely move the tapered members 22 and 23 longitudinally relatively to the slides 20 and 21 respectively. In some cases the arrangement shown in Fig. 2 may prove more desirable and accurate.

In the arrangement of Fig. 2, the shaft 11, fly balls 14, and slide 20 are the same as in Fig. 1. Instead, however, of the internal cone 22, two hinged plates 22ᵃ are provided, these plates being arranged to be moved in and out according as the current in the magnet 24ᵃ, which is connected in the same manner as the magnet 24 in Fig. 1, decreases or increases. By such an arrangement it is often possible to obtain more accurate cutting off of the motor current at the proper point.

While I have shown my invention as applied where an automatic stop is to be obtained only at the extreme limits of movement of the driven mechanism it is also applicable where such automatic stops are to be obtained at intermediate points, as at the different floors in an elevator system.

Many modifications in the precise arrangement here shown and described may be made without departing from the spirit and scope of my invention, and all such I aim to cover in the following claims.

What I claim as new is:—

1. In combination, power-driven mechanism, and means for interrupting the supply of power to such mechanism when the latter is approaching a predetermined stopping point and is at a distance therefrom which is a function of the speed of the driven mechanism.

2. In combination, power-driven mechanism, and means for interrupting the supply of power to such mechanism when the latter is approaching a limit of its travel and is at a distance therefrom which is a function of the power supplied to such driven mechanism.

3. In combination, power-driven mechanism, and means for interrupting the supply of power to such mechanism when the latter is approaching a predetermined stopping point and is at a distance therefrom which is a function of the speed of the driven mechanism and of the load which such mechanism places on its source of power.

4. In combination, a source of power, mechanism driven thereby, and means for interrupting the supply of power by such source to such mechanism when the latter is approaching a limit of its movement and is at a distance therefrom which is a direct function of the speed of such mechanism.

5. In combination, a source of power, mechanism driven thereby, and means for interrupting the supply of power by such source to such mechanism when the latter is approaching a limit of its movement and is at a distance therefrom which is an inverse function of the load which such mechanism places upon such source of power.

6. In combination, a source of power, mechanism driven thereby, and means for interrupting the supply of power by such source to such mechanism when the latter is approaching a predetermined stopping point and is at a distance therefrom which is a direct function of the speed of such mechanism and an inverse function of the power which is being supplied to such mechanism by such source of power.

7. In combination, an electric motor, mechanism driven thereby, and means for interrupting the supply of current to the motor when such driven mechanism is at a distance from a limit of its movement which is a function of its speed.

8. In combination, an electric motor, mechanism driven thereby, and means for interrupting the supply of current to the motor when such driven mechanism is at a distance from a limit of its movement which is a function of the power supplied by such motor to such mechanism.

9. In combination, an electric motor, mechanism driven thereby, and means for interrupting the supply of current to the motor when such driven mechanism is at a distance from a predetermined stopping point which is a function of its speed and of the load on the motor.

10. In combination, an electric motor, mechanism driven thereby, and means for interrupting the supply of current to the motor when such mechanism reaches a point in its approach to a predetermined stopping point the distance of which from such stopping point is a direct function of the speed of the driven mechanism.

11. In combination, an electric motor, mechanism driven thereby, and means for interrupting the supply of current to the motor when such mechanism reaches a point in its approach to a predetermined stopping point the distance of which from such stopping point is an inverse function of the load on the motor.

12. In combination, an electric motor, mechanism driven thereby, and means for interrupting the supply of current to the motor when such mechanism reaches a point in its approach to a limit of its movement the distance of which from such limit of movement is a direct function of the speed of the driven mechanism and an inverse function of the power supplied by such motor to such mechanism.

13. In an electric elevator, provided with automatic stop switches to stop the car at top and bottom landing, means actuated by the elevator mechanism to cause these switches to act earlier if the speed of the car is high, than they will if the speed is low.

14. In an electric elevator provided with switches to stop the car automatically at top and bottom of its travel, a governor actuated by the elevator mechanism, and arranged to cause the switches to act earlier when the car speed is high, than when the car speed is low.

15. In an electric elevator provided with automatic stop switches which stop the car at predetermined points, means actuated by the elevator mechanism to cause these switches to act earlier if the speed of the car is high than they will if the speed of the car is low.

16. In an electric elevator provided with switches which stop the car automatically at predetermined points in its travel, a governor actuated by the elevator mechanism and arranged to cause the switches to act earlier when the car speed is high than when the car speed is low.

17. In an electric elevator provided with automatic stop switches to stop the car at top and bottom landing, means for driving the elevator, and means actuated by the elevator mechanism for causing said stop switches to act later if the load on the driving means is heavy than they will if such load is light.

18. In an electric elevator provided with switches to stop the car automatically at top and bottom of its travel, means for driving said elevator, and a governor actuated by the elevator mechanism and arranged to cause the switches to act later when the load on such driving means is heavy than when such load is light.

19. In an electric elevator provided with stop switches to stop the car at predetermined points in its travel, means for driving such elevator, and means actuated by the elevator mechanism to cause said stop switches to act earlier if the load on such driving mechanism is light than they will if such load is heavy.

20. In an electric elevator provided with switches to stop the car automatically at predetermined points in its travel, means for driving such elevator, and a governor actuated by the elevator mechanism and arranged to cause the switches to act earlier when the load on such driving means is light than when such load is heavy.

In testimony whereof I affix my signature, in the presence of two witnesses.

ALBERT G. WESSLING.

Witnesses:
 Geo. B. Schley,
 Fred J. Kinsey.